(12) United States Patent
Suzuki et al.

(10) Patent No.: US 12,454,093 B2
(45) Date of Patent: Oct. 28, 2025

(54) HEAT-SHRINKABLE TUBE HAVING TEARABLE PROPERTIES

(71) Applicant: Junkosha Inc., Kasama (JP)

(72) Inventors: Masahiro Suzuki, Kasama (JP); Yasuyuki Kimura, Kasama (JP)

(73) Assignee: JUNKOSHA INC., Kasama (JP)

( * ) Notice: Subject to any disclaimer, the term of this patent is extended or adjusted under 35 U.S.C. 154(b) by 994 days.

(21) Appl. No.: 17/427,189

(22) PCT Filed: Jan. 30, 2020

(86) PCT No.: PCT/JP2020/003402
§ 371 (c)(1),
(2) Date: Feb. 28, 2022

(87) PCT Pub. No.: WO2020/158854
PCT Pub. Date: Aug. 6, 2020

(65) Prior Publication Data
US 2022/0176615 A1 Jun. 9, 2022

(30) Foreign Application Priority Data

Jan. 31, 2019 (JP) ................. 2019-015563
Feb. 4, 2019 (JP) ................. 2019-017799
(Continued)

(51) Int. Cl.
B29C 61/08 (2006.01)
F16L 11/06 (2006.01)
F16L 11/12 (2006.01)

(52) U.S. Cl.
CPC .............. B29C 61/08 (2013.01); F16L 11/06 (2013.01); F16L 11/12 (2013.01)

(58) Field of Classification Search
CPC .............. B29C 61/08; A61M 25/0009; A61M 25/0662; B29D 23/00; B29K 2027/12; B29L 2023/001; F16L 11/06; F16L 11/12
See application file for complete search history.

(56) References Cited

U.S. PATENT DOCUMENTS

| 2015/0232653 A1 | 8/2015 | Fujita et al. |
| 2016/0222145 A1 | 8/2016 | Suzuki et al. |
| 2018/0292031 A1 | 10/2018 | Wolfe et al. |

FOREIGN PATENT DOCUMENTS

| DE | 2715971 | 10/1978 |
| EP | 0494679 A1 | 7/1992 |

(Continued)

OTHER PUBLICATIONS

Office Action Issued Feb. 15, 2023 In Corresponding Chinese Patent Application No. 202080026174.9.
(Continued)

Primary Examiner — Yan Lan
(74) Attorney, Agent, or Firm — DUANE MORRIS LLP

(57) ABSTRACT

The disclosure provides a tube which is rarely broken and is stable during the process of the production of a heat-shrinkable tube having tearability in a length direction. The tube includes a melt-processable fluororesin and when the strain of the tube is defined as ε, the stress at the strain is defined as σ (MPa) and the strain ε is put on the horizontal axis and the stress σ is put on the longitudinal axis on a coordinate graph, each of a straight line ab and a straight line cd which are defined by four coordinate points a (0.4,8.8), b(0.4,2.4), c(1.0,9.9) and d(1.0,3.2) on the graph intersects with a mechanical property curve of the tube which is obtained by carrying out a tensile test under the conditions of an ambient temperature of 60° C., an initial chuck-to-chuck distance of 22±0.05 mm and a tensile speed of 5 mm/sec.

5 Claims, 1 Drawing Sheet

(30) Foreign Application Priority Data

Sep. 13, 2019 (JP) ................................ 2019-167695
Jan. 30, 2020 (JP) ................................ 2020-013370

(56) References Cited

FOREIGN PATENT DOCUMENTS

| | | | |
|---|---|---|---|
| EP | 2749802 | A1 | 7/2014 |
| EP | 3311982 | A1 | 4/2018 |
| GB | 2023061 | | 12/1979 |
| JP | H02258324 | A | 10/1990 |
| JP | H08216252 | A | 8/1996 |
| JP | 2004-123920 | | 4/2004 |
| JP | 2010253729 | A | 11/2010 |
| JP | 2014136756 | A | 7/2014 |
| JP | 2016169856 | A | 9/2016 |
| JP | 2017-044335 | | 3/2017 |
| WO | 2013077452 | A | 4/2015 |

OTHER PUBLICATIONS

International Standard, "Plastics—Determination of tensile properties—Part 1: General principles", ISO 527-1: 2019(E), Third edition Jul. 2019.

HEAT-SHRINKABLE TUBE HAVING TEARABLE PROPERTIES

CROSS-REFERENCE TO RELATED APPLICATIONS

This application is the United States national phase of International Application No. PCT/JP2020/003402 filed Jan. 30, 2020, and claims priority to Japanese Patent Application Nos. 2019-015563 filed Jan. 31, 2019; 2019-017799 filed February 4; 2019-167695 filed Sep. 13, 2019, and 2020-013370 filed Jan. 30, 2020, the disclosures of which are hereby incorporated by reference in their entirety.

BACKGROUND OF THE DISCLOSURE54J9864.DOCX

The present disclosure relates to a heat-shrinkable tube capable of being easily torn in a longitudinal direction thereof.

DESCRIPTION OF RELATED ART

A tube capable of being easily torn in a longitudinal direction thereof serves as a protective member for various articles until the use thereof. In particular, a tearable tube made of a fluororesin exhibits the properties of a fluororesin, such as heat resistance, chemical resistance, water and oil repellency, non-tackiness, self-lubrication, and the like, which cannot be obtained using a hydrocarbon-based synthetic resin. The tube having such properties is used as a protective tube for precision devices, electronic parts, etc., or a medical-device introduction tube for introducing a catheter, a guide wire, etc. into the body.

A tube having tearability, further imparted with heat shrinkability, functions to assuredly protect an article placed therein without breaking, and is also used as a jig for manufacturing a catheter. A heat-shrinkable tube having tearability may be easily torn and removed without the need to use a special tool when it is no longer needed. For example, Patent Document 1 discloses a heat-shrinkable tube having tearability made of a fluororesin mixture. However, since the tube is easily torn, there is a problem in that the tube is liable to burst in the process of expanding the tube to increase the diameter thereof in order to impart heat shrinkability to the tube, making it difficult to realize stable production.

Prior Art Patent Document 1: US2015/0354732

The present disclosure is intended to provide a heat-shrinkable tube capable of being easily torn in a longitudinal direction thereof, particularly a tube, which is less likely to burst in the process of expanding the tube to increase the diameter thereof during manufacture thereof, thus making it possible to realize stable production.

SUMMARY OF THE DISCLOSURE

Accordingly, the present inventors discovered the fact that, when the mechanical property curve obtained in a tensile test of a tube, among the mechanical properties of the tube, falls within a specific range, the tube is less likely to burst in the process of expanding the tube to increase the diameter thereof during manufacture of the tube, thus making it possible to realize stable production, thereby culminating in the present disclosure.

The tube of the present disclosure is a heat-shrinkable tube having tearability containing at least a melt-processable fluororesin, in which the strain of the tube is represented as $\varepsilon$, the stress at the strain is represented as $\sigma$ (MPa), the horizontal axis on a coordinate graph is the strain $\varepsilon$, the vertical axis thereon is the stress a, and each of the straight line ab and the straight line cd defined by four coordinate points on the graph, a (0.4, 8.8), b (0.4, 2.4), c (1.0, 9.9), and d (1.0, 3.2), intersects the mechanical property curve of the tube obtained through the following measurement method. As such, the tube is less likely to burst in the process of expanding the tube, making it easy to obtain a reliable tube. The mechanical property curve is determined by performing a tensile test under the conditions of an ambient temperature of 60° C., an initial chuck-to-chuck distance of 22±0.05 mm, and a tensile speed of 5 mm/sec.

In the mechanical property curve of the tube, the region defined by four coordinate points on the graph preferably intersects each of the straight line a'b and the straight line c'd defined by four coordinate points, a'(0.4, 7.6), b (0.4, 2.4), c'(1.0, 8.9), and d (1.0, 3.2).

The tube of the present disclosure is a heat-shrinkable tube having tearability containing at least a melt-processable fluororesin, in which the strain of the tube is represented as $\varepsilon$, the stress at the strain is represented as $\sigma$ (MPa), the horizontal axis on a coordinate graph is the strain $\varepsilon$, the vertical axis thereon is the stress $\sigma$, and in the mechanical property curve of the tube obtained through the above-mentioned measurement method, the stress $\sigma$ at the strain $\varepsilon$ of 1.0 is 3.2 MPa or more, and when the coordinate point at the strain $\varepsilon$ of 1.0 on the mechanical property curve is represented as e and the coordinate point at the strain $\varepsilon$ of 2.0 on the mechanical property curve is represented as f, the slope of a straight line passing through the coordinate point e and the coordinate point f is 2.4 to 3.0 MPa. Here, in the process of expanding the tube, the tube is less likely to burst, making it easy to obtain a reliable tube.

The fluororesin constituting the heat-shrinkable tube having tearability according to the present disclosure preferably includes at least a resin including at least three monomers of tetrafluoroethylene, hexafluoropropylene, and vinylidene fluoride as constituent monomers. Examples of the resin including at least three monomers of tetrafluoroethylene, hexafluoropropylene, and vinylidene fluoride as constituent monomers may include tetrafluoroethylene-hexafluoropropylene-vinylidene fluoride copolymer (THV), tetrafluoroethylene-hexafluoropropylene-vinylidene fluoride-perfluoroalkyl vinyl ether copolymer, and the like.

The heat-shrinkable tube having tearability according to the present disclosure may include a plurality of fluororesins, so it may include another fluororesin, aside from the fluororesin including at least three monomers of tetrafluoroethylene, hexafluoropropylene, and vinylidene fluoride as constituent monomers. It is preferable that the resin including at least three monomers be contained in as large an amount as possible, and the resin including at least three monomers is preferably contained in an amount of 25 wt % to 95 wt %. The resin including at least three monomers is more preferably contained in an amount of 40 wt % or more, and particularly preferably 50 wt % or more. When the fluororesin constituting the tube includes a plurality of resins each including at least three monomers of tetrafluoroethylene, hexafluoropropylene, and vinylidene fluoride as constituent monomers, the total amount of the plurality of resins is taken as the content.

In the fluororesin constituting the heat-shrinkable tube having tearability according to the present disclosure, the resin including at least three monomers of tetrafluoroethylene, hexafluoropropylene, and vinylidene fluoride as constituent monomers is preferably a copolymer including 15 wt % to 25 wt % of vinylidene fluoride.

The heat-shrinkable tube having tearability according to the present disclosure preferably includes a plurality of fluororesins, and the maximum difference in refractive index (ASTM D542) between the plurality of fluororesins is preferably 0.05 or less. Here, the "fluororesin" of the plurality of fluororesin is a fluororesin contained in an amount of 3 wt % or more among the total fluororesins.

According to the present disclosure, a heat-shrinkable tube can be stably produced without bursting of a tube in the process of expanding a tearable tube to increase the diameter thereof.

DETAILED DESCRIPTION

Hereinafter, embodiments for carrying out the present disclosure will be described in detail. The embodiments described below are merely set forth to illustrate the present disclosure, and are not to be construed as limiting the disclosure, which is to be understood based on the claims. Moreover, the combination of features described in the embodiments is not always essential for the establishment of the present disclosure.

Figure 1:
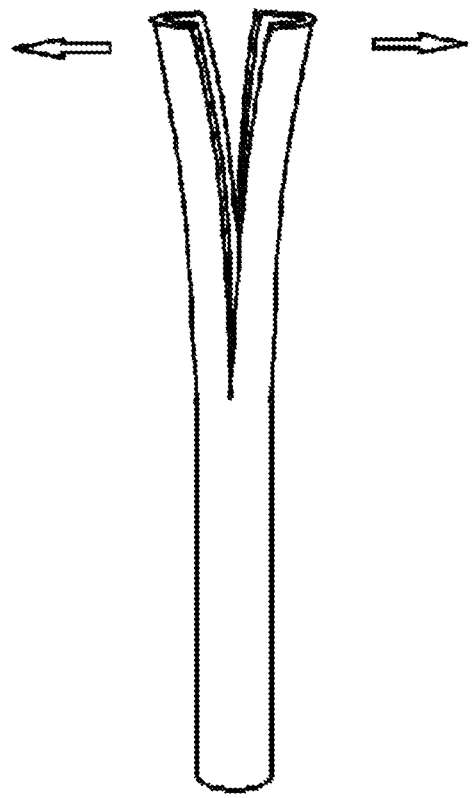
FIG. 1 illustrates the tearability of a tube of the present disclosure.

As illustrated in FIG. 1, the tube of the present disclosure is capable of being easily torn in the longitudinal direction thereof, and may be torn from one end of the tube to the opposite end of the tube. The tube may be notched as needed.

The tube of the present disclosure is also heat-shrinkable. In order to impart heat shrinkability to the tube, the tube may be processed through a general method. For example, the following method may be used.

A fluororesin that is melt-processable is used as a material for the tube of the present disclosure. Here, a plurality of resins may be used, and the mechanical properties of the tube of the present disclosure may be adjusted. Examples of the fluororesin that is commonly used include THV, tetrafluoroethylene-hexafluoropropylene copolymer (FEP), tetrafluoroethylene-perfluoroalkyl vinyl ether (PFA), ethylene-tetrafluoroethylene copolymer (ETFE), ethylene-tetrafluoroethylene-hexafluoropropylene copolymer (EFEP), polychlorotrifluoroethylene (PCTFE), and the like. The mixing of fluororesin materials may be performed by blending pellets using a tumbler or the like, but is more preferably carried out by forming pellets after melt-kneading using a twin-screw extruder. As such, a resin such as PTFE, which does not melt at high temperatures, may be added as an additive. Moreover, components that act as a compatibilizer in order to promote the dispersion of the resin, or additives that have other functions, such as crystallinity, adjustment of tube flexibility or tube hardness, improvement of mechanical properties, and the like, may also be added.

The resin prepared above is melt-extruded into a tube shape using a single-screw extruder, and the tube thus obtained is a tube (hereinafter referred to as an original tube) which is a material for a heat-shrinkable tube.

While the original tube is heated to a temperature equal to or higher than the glass transition temperature of the resin constituting the original tube, pressurized gas is injected therein, and the tube is pressurized from the inside to expand in the radial direction thereof. The tube is cooled while maintaining the pressurized state to obtain a heat-shrinkable tube.

Bursting that occurs in the conventional process of manufacturing a heat-shrinkable tube having tearability, which is to be solved in the present disclosure, takes place mainly when the tube is pressurized from the inside through heating in the process of expanding the original tube in the above-described manufacturing process.

Figure 2:
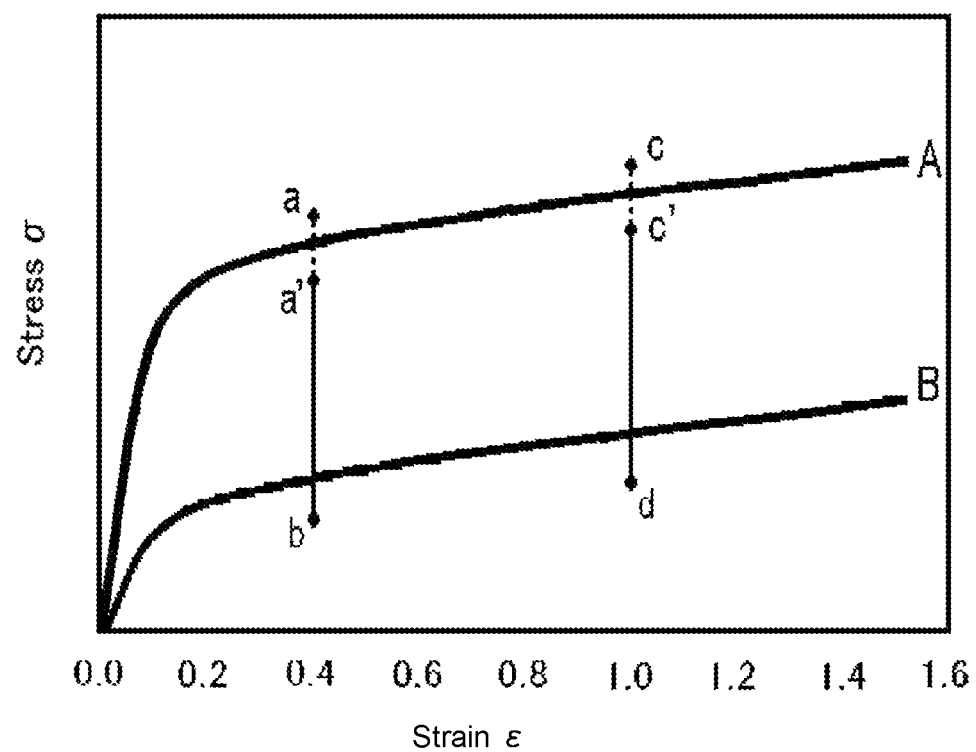
FIG. 2 illustrates an example of the mechanical property curve of each of a conventional tube and the tube of the present disclosure.

FIG. 2 illustrates an example of the mechanical property curve of the tube on a graph, in which the strain $\varepsilon$ of the tube is plotted on the horizontal axis and the stress $\sigma$ (MPa) at the strain is plotted on the vertical axis. The curves A and B are preferred examples of the mechanical property curve of the heat-shrinkable tube having tearability according to the present disclosure. The curve A and the curve B intersect each of the straight line ab and the straight line cd, defined by four coordinate points. The curve B also intersects each of the straight lines a'b and c'd. In the heat-shrinkable tube having tearability according to the present disclosure with the mechanical properties represented by the curves A and B, the mechanical property curve intersects each of the straight line ab and the straight line cd, and it is difficult to cause bursting in the process of expanding the original tube. Moreover, when the mechanical property curve intersects each of the straight lines a'b and c'd, the tube is less likely to burst even when it is expanded instantaneously in the process of expanding the original tube, thus making it easy to obtain a reliable tube.

The heat-shrinkable tube having tearability according to the present disclosure preferably includes a plurality of fluororesins, and the maximum difference in refractive index (ASTM D542) between the plurality of fluororesins is preferably 0.05 or less. Here, the refractive index that is used is a measured value according to ASTM D542. The refractive index of the resin is related to the molecular structure of the resin. Fluororesins having similar refractive indexes have similar molecular structures, and when resins are blended, adhesion between resins may be obtained at the interface of the dispersed resins, which is more preferable.

In the heat-shrinkable tube having tearability according to the present disclosure, the stress $\sigma$ at the strain $\varepsilon$ of 1.0 on the mechanical property curve of the tube is 3.2 MPa or more, and when the coordinate point at the strain $\varepsilon$ of 1.0 on the mechanical property curve is represented as e and the coordinate point at the strain $\varepsilon$ of 2.0 on the mechanical property curve is represented as f, the slope of a straight line passing through the coordinate point e and the coordinate point f is preferably 2.4 to 3.0 MPa. Here, in the process of expanding the original tube, the tube is less likely to burst, making it easy to obtain a reliable tube.

The disclosure will be described in more detail with reference to the following examples.

A measurement sample of the tube was manufactured through the following method.

Manufacture of measurement sample: a tube was sandwiched between polyimide films having a smooth surface and melt-pressed using a hot press to obtain a film having a thickness of 0.10 to 0.12 mm. A specific embodiment of film production is described below. The tubes cut depending on the size of the film to be produced were arranged, sandwiched between polyimide films having a smooth surface, heated to a temperature 20° C. to 50° C. higher than the melting point of the fluororesin having the highest melting point among the plurality of fluororesins constituting the tube using a hot press, and primarily melt-pressed to obtain a preformed film having a thickness of about 0.2 mm. The preformed film thus obtained was divided radially into four from the center of the film, the quartered films were stacked while changing the direction of the film, sandwiched again between the polyimide films having a smooth surface, heated to a temperature 20° C. to 50° C. higher than the melting point of the fluororesin having the highest melting point among the plurality of fluororesins constituting the tube using a hot press, and secondarily melt-pressed to obtain a film having a thickness of 0.1 to 0.12 mm. The film thus obtained was allowed to stand at room temperature until the next day, and was then punched in a dumbbell shape according to ASTM D1708 to prepare a measurement sample.

A tensile test was performed on the tube measurement sample using a tensile tester. The measurement was performed under the conditions of a measurement temperature of 60° C., an initial chuck-to-chuck distance of 22 mm±0.05 mm, and a tensile speed of 5 mm/sec. The other conditions were in accordance with ASTM D1708. The measured strain was calculated based on the following Equation 1. Also, the strain of the tube is represented as ε, the stress at the strain is represented as σ (MPa), the horizontal axis on the coordinate graph is the strain ε, and the vertical axis thereon is the stress σ, whereby the mechanical property curve of the tube is created.

$$\text{Strain } \varepsilon = \frac{\text{increase in chuck-to-chuck distance}}{\text{initial chuck-to-chuck distance}}$$

In each of Examples and Comparative Examples, resins including components at the following mixing ratios were prepared.

Example 1

THV (containing about 17 wt % of VDF): 80 wt %
FEP (FEP 130-J manufactured by Chemours-Mitsui Fluoroproducts Co. Ltd.): 20 wt %

Example 2

THV (containing about 20 wt % of VDF): 75 wt %
FEP (FEP NP-3180 manufactured by Daikin Industries, Ltd.): 25 wt %

Example 3

THV (containing about 22 wt % of VDF): 50 wt %
PFA (PFA AP-202 manufactured by Daikin Industries, Ltd.): 50 wt %

Example 4

THV (containing about 20 wt % of VDF): 25 wt %
FEP (FEP 9494X manufactured by Chemours-Mitsui Fluoroproducts Co. Ltd.): 75 wt %

Example 5

THV (containing about 22 wt % of VDF): 90 wt %
PFA (PFA 420HP-J manufactured by Chemours-Mitsui Fluoroproducts Co. Ltd.): 10 wt %

Example 6

THV (containing about 20 wt % of VDF): 60 wt %
THV (containing about 17 wt % of VDF): 20 wt %
FEP (FEP 130-J manufactured by Chemours-Mitsui Fluoroproducts Co. Ltd.): 20 wt %

Example 7

THV (containing about 20 wt % of VDF): 90 wt %
ETFE (ETFE C88AX-P manufactured by Asahi Glass Co. Ltd.): 10 wt %

The materials prepared at the mixing ratios of Examples and Comparative Examples were sufficiently stirred using a tumbler and pelletized using a twin-screw extruder having a cylinder diameter of 20 mm.

The material pellets prepared in each of Examples and Comparative Examples were formed into a tube using a single-screw extruder having a cylinder diameter of 20 mm, and the tube thus obtained was used as an original tube for a heat-shrinkable tube.

The original tube was expanded in the radial direction by injecting pressurized nitrogen into the tube while performing heating from outside the tube to pressurize the inside of the tube. The tube was cooled while maintaining the internal pressure of the tube to obtain a heat-shrinkable tube.

The original tube was expanded by injecting pressurized nitrogen into the tube while performing heating from outside the tube to pressurize the inside of the tube and then by performing pressurization instantaneously until the inner diameter of the tube was expanded more than 300% of the original diameter thereof. Here, the burst probability of the tube is shown in Table 1 below. When the burst probability upon expansion under the present conditions is about 20%, it is regarded as the numerical value at which the product may be produced stably in the expansion process during manufacture of a product, and when the burst probability is as low as 10%, the tube is less likely to burst, making it easy to obtain a more reliable tube.

The results of measurement for Examples and Comparative Examples are shown in Table 1 below.

|  |  | Example 1 | Example 2 | Example 3 | Example 4 | Example 5 | Example 6 | Example 7 |
|---|---|---|---|---|---|---|---|---|
| Stress at strain ε of 0.4 on mechanical property curve | Mpa | 8.02 | 6.21 | 4.94 | 7.35 | 3.37 | 6.68 | 5.69 |
| Stress at strain ε of 1.0 on mechanical property curve | Mpa | 9.35 | 7.34 | 5.77 | 8.39 | 4.40 | 7.84 | 6.87 |
| Resin 1 Refractive index |  | 1.35 | 1.35 | 1.36 | 1.35 | 1.35 | 1.35 | 1.36 |

-continued

|  | Example 1 | Example 2 | Example 3 | Example 4 | Example 5 | Example 6 | Example 7 |
|---|---|---|---|---|---|---|---|
| Resin 2 Refractive index | 1.34 | 1.34 | 1.34 | 1.34 | 1.34 | 1.35 | 1.42 |
| Resin 3 Refractive index |  |  |  |  |  | 1.34 |  |
| Maximum refractive index difference | 0.01 | 0.01 | 0.02 | 0.01 | 0.01 | 0.01 | 0.06 |
| Burst probability % | 8.4 | 3.2 | 5.8 | 6.5 | 6.7 | 5.1 | 7.9 |

In all of the tubes of Examples 1 to 7, the mechanical property curve intersected each of the straight line ab and the straight line cd, and in the expansion test of the original tube, the burst probability was low and stable expansion was possible. In particular, Examples 1 to 6 were made of fluororesin having a maximum refractive index difference of 0.05 or less between resins, and could be stably expanded even when the tube was expanded instantaneously because the internal pressure of the tube at the time of expansion was set high.

Example 8

Tubes were manufactured using THV (containing about 17 wt % of VDF, refractive index: 1.35) or THV (containing about 20 wt % of VDF, refractive index: 1.35) as THV and FEP 130-J or FEP 9494X as FEP at various mixing ratios. The materials thus prepared were sufficiently stirred using a tumbler and pelletized using a twin-screw extruder having a cylinder diameter of 20 mm. The material pellets thus obtained were extruded to DDRB-9 using a single-screw extruder having a cylinder diameter of 20 mm to prepare original tubes, which were then manufactured into heat-shrinkable tubes through the above method. In each of the tubes thus obtained, the stress $\sigma$ at the strain $\varepsilon$ of 1.0 on the mechanical property curve of the tube was 3.2 MPa or more, and the slope of a straight line passing through the coordinate point e at the strain $\varepsilon$ of 1.0 and the coordinate point f at the strain $\varepsilon$ of 2.0 fell in the range of 2.4 to 3.0 MPa. Moreover, based on the result of an expansion test, the burst probability was 20% or lower.

In a heat-shrinkable tube having tearability according to the present disclosure, the tube is less likely to burst in the process of imparting heat-shrinkability to an original tube, making it easy to obtain a reliable tube. The tube of the present disclosure is useful as a medical-device introduction tube for introducing a catheter, a guide wire, etc. into the body, a jig used for manufacturing a catheter, and a tube for protecting precision devices, electronic parts, and the like.

The invention claimed is:

1. A heat-shrinkable tube having tearability comprising at least a melt-processable fluororesin, wherein
   a strain of the tube is represented as $\varepsilon$, a stress at the strain is represented as $\sigma$ (MPa), a horizontal axis on a coordinate graph is a strain $\varepsilon$, a vertical axis thereon is a stress $\sigma$, and in a mechanical property curve of the tube obtained through a measurement method comprising a tensile test being performed under conditions of an ambient temperature of 60° C., an initial chuck-to-chuck distance of 22±0.05 mm, and a tensile speed of 5 mm/sec., the stress $\sigma$ at the strain of 1.0 is 3.2 MPa or more, and
   when a coordinate point at the strain $\varepsilon$ of 1.0 on the mechanical property curve is represented as e and a coordinate point at the strain $\varepsilon$ of 2.0 on the mechanical property curve is represented as f, a slope of a straight line passing through the coordinate point e and the coordinate point f is 2.4 to 3.0 Mpa.

2. The heat-shrinkable tube having tearability according to claim 1, wherein the fluororesin comprises at least a resin comprising at least three monomers of tetrafluoroethylene, hexafluoropropylene, and vinylidene fluoride as constituent monomers.

3. The heat-shrinkable tube having tearability according to claim 2, wherein the resin comprising at least three monomers of tetrafluoroethylene, hexafluoropropylene, and vinylidene fluoride as constituent monomers is contained in an amount of 25 wt % to 95 wt %.

4. The heat-shrinkable tube having tearability according to claim 2, wherein the resin comprising at least three monomers of tetrafluoroethylene, hexafluoropropylene, and vinylidene fluoride as constituent monomers is a copolymer comprising 15 wt % to 25 wt % of vinylidene fluoride.

5. The heat-shrinkable tube having tearability according to claim 1, comprising a plurality of fluororesins, wherein a maximum difference in refractive index (ASTM D542) between the plurality of fluororesins is 0.05 or less.

* * * * *